Patented Dec. 6, 1932

1,889,956

UNITED STATES PATENT OFFICE

PHILIP H. FALTER, OF ORANGE, NEW JERSEY, ASSIGNOR TO AMERICAN CYANAMID COMPANY, OF NEW YORK, N. Y., A CORPORATION OF MAINE

METHOD OF PRODUCING AMMONIA

No Drawing.   Application filed February 27, 1929.   Serial No. 343,246.

This invention relates to a method of producing ammonia from crude cyanamide or lime nitrogen according to the following reaction:

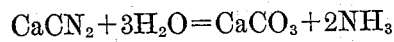

$$CaCN_2 + 3H_2O = CaCO_3 + 2NH_3$$

In United States Patents Nos. 1,154,640 and 1,163,095, both to W. S. Landis, there is disclosed that a reaction may be had between calcium cyanamide and water by injecting steam into a cyanamide-water slurry in a closed vessel, and that due to the fact that the reaction is strongly exothermic, the steam may be used for a short time to start the reaction, and then the reaction will be carried to completion by using the steam only intermittently. These patents described a procedure in which steam was admitted three times to the charge in order to obtain a high recovery of ammonia.

The patent to Elbert, 1,313,885 modified the prior processes of producing ammonia from cyanamide by omitting one of the steam admissions, and his process consisted essentially in introducing steam to an autoclave charged with a cyanamide slurry, but before admitting a second charge of steam he discharged the bulk of the ammonia generated in the first reaction, and this discharge of ammonia brought the pressure within the autoclave down to atmospheric. Steam was again admitted and the reaction further proceeded, and upon completion the thus generated ammonia was discharged as before.

In all of the prior methods of thus treating cyanamide to produce ammonia, a lack of efficiency has existed and I have discovered the cause thereof. If the charge is maintained at a temperature of 160° C. or below for any appreciable length of time, difficultly decomposable nitrogen compounds are formed which cannot be readily broken up and, therefore, there is a consequent loss of available ammonia. This is shown in the fact that the prior Landis patents referred to, contemplate passing the charge through this deleterious temperature zone while the reaction is going on five times, in the three steaming periods, and the Elbert process subjects the slurry to this low temperature three times in his double steaming method.

Other inefficiencies in the prior processes resided in the fact that the charge was permitted to lose its temperature and pressure prior to the completion of the reaction so that it was necessary to again add steam in order to begin anew the exothermic reaction.

It is among the objects of the present invention to overcome the above mentioned deficiencies of the prior art and to secure a high conversion into ammonia of the crude cyanamide with the minimum requirement of steam or heat, and in a cycle of operations requiring a period of time less than any of which I am now aware.

This invention, therefore, contemplates the reaction between cyanamide and water in a closed vessel by applying heat thereto until an exothermic reaction between the two compounds begins, which is appoximately 160° C. This heat may be reached by applying steam directly into the slurry or otherwise, as desired. As soon as the reaction has started heat is cut off and the reaction permitted to run to completion under its own generated heat. It may be desirable in certain types of autoclaves, where there is a limit to the pressure which the apparatus will stand, to vent the ammonia when a safe pressure has been reached, and this removal may continue as long and in such quantity as will not cause a drop in temperature of the reacting slurry to below 160° C. Thus, the complete reaction of the water and cyanamide takes place at a temperature above that at which the difficultly decomposable nitrogen compounds are formed and, therefore, a minimum amount thereof is formed during the reaction. When the reaction has been completed the ammonia is completely exhausted from the vessel, any entrained ammounia blown therefrom, the charge filtered, and the spent liquor returned for a fresh cycle.

In practicing my invention I use a crude calcium cyanamide which contains, in addition to the lime nitrogen compound ($CaCN_2$), a certain amount of unconverted calcium oxide and calcium carbide resulting from an incomplete reaction in the cyanamide production furnace.

I prefer to secure ammonia from the above mentioned crude cyanamide by a reaction with spent liquor from a previous batch. This spent liquor contains some alkali such as caustic soda produced in the reaction, and I may add thereto a sufficient amount of caustic soda or soda ash so that an efficient reaction will take place. The caustic, or soda ash, acts in the nature of a catalyst and plays no part in the actual reaction of the cyanamide and water.

The apparatus used is an autoclave of any desired type dependent upon the size of the charge to be treated. I prefer to use a charge in the proportions of 8500 lbs. of cyanamide and 18,000 lbs. of water. This water may be in the main the spent liquor from a prior cycle which has been treated in the make-up tanks with, say 200 lbs. of soda ash to give the required degree of alkalinity.

The above material being charged into the digester, a reaction immediately begins, the unconverted calcium carbide generating acetylene. This preliminary reaction takes place very quickly and the acetylene gas is permitted to escape before the autoclave is closed. If desired, a preliminary blowing may be given to the space above the slurry to completely remove all acetylene therefrom, and prevent the danger of explosions during further treatment.

After the acetylene evolution period, the autoclave is closed and steam admitted. In practice I have found steam under a boiler pressure of 125 lbs. to be satisfactory, although the higher the steam pressure the greater its temperature, and consequently the quicker a reacting temperature will be reached, which is desirable as it is among the objects of my invention to pass the charge through the temperature zone under 160° C. as quickly as possible.

Obviously, heat may be applied to the slurry in any other desired manner such as by means external to the digester. or by electrical heating units located within the charge, but steam is a convenient medium for conducting heat to the charge.

After a comparatively short period and probably not exceeding fifteen minutes, the charge will have reached a temperature of 160° C. and probably a pressure of approximately four atmospheres. At that point the steam or other heat may be cut off and the exothermic reaction will continue with the generation of ammonia. I find it desirable to permit the pressure within the autoclaves to reach approximately sixteen atmospheres, this being a safe load for the apparatus. Further rise in pressure due to continued generation of ammonia may be prevented by slowly discharging the ammonia therefrom. Of course, in autoclaves constructed to withstand a higher pressure, it will be found desirable to permit the reaction to continue without discharging the ammonia therefrom as the higher the temperature within the autoclave, the less likelihood there is for the difficultly decomposable nitrogen compounds being formed.

I permit a slow discharge of ammonia for at least two hours, which causes not only a diminution of temperature within the autoclave but likewise a reduction of the pressure. However, it is important that the discharge of ammonia take place only at such a rate as to maintain a temperature as far above 160° C. as possible and at no time permit a drop below that temperature. The reaction is permitted to continue to completion above this temperature and I have found that the reaction as far as commercial production is concerned, is complete in about two hours and thirty minutes from the time the charge reaches the reaction temperature. After this time the ammonia may then be completely exhausted and the pressure within the autoclave reduced to atmospheric with consequent cooling. At this point it may be desirable to blow the entrained ammonia from the residual charge with steam. After the blowing operation the charge is subjected to a filtering step in a device of any desired type and to which no claim is here made, the cake being preferably washed once with water and the spent liquor returned for a new cycle.

In carrying out the above operation I have been able to complete the cycle in approximately four hours as against five and one-half or six hours for those previously used. As to steam consumption, I find that approximately 2,000 lbs. is required to raise the temperature of the slurry to begin the reaction and 4,500 lbs. for the blowing operation, making a total steam requirement for my method of 6,500 lbs. In the old process where a double or triple steaming was used 4,000 lbs. of steam was required for the second or additional steamings due to the fact that the reaction was partially completed, so that with the present method I am able to save from 4,000 to 8,000 lbs. of steam over those heretofore practiced.

It will be readily seen that by the use of this procedure the reacting slurry is passed through the zone under 160° C. only once and at the beginning thereof. The second time that the charge passes through the zone is at the end of the reaction when the only ammonia contained therein is substantially that entrained in the liquor whereas in the processes prior hereto the charge passed three to five times through this zone, while the reaction was incomplete, with the result that an appreciable quantity of difficultly decomposable compounds was formed which could not be readily broken up, with resultant loss of ammonia.

With the present procedure I am able to recover almost quantitative amounts of ammonia with less steam or applied heat and over a materially less length of time. I place great emphasis upon the fact that in this single steaming operation the reaction is permitted to run to completion before permitting the temperature to drop below 160° C.

What I claim is:

1. A process of making ammonia from cyanamide which consists in adding cyanamide and water to a vessel, raising the temperature thereof to at least 160° C. and maintaining at least that temperature until the reaction is substantially complete, beginning the discharge of ammonia after the charge reaches 160° C. and removing substantially all the ammonia generated while the charge is above that temperature.

2. A process of making ammonia from cyanamide which consists in making a slurry of cyanamide and an aqueous fluid from a previous batch, applying heat thereto until an exothermic reaction takes place, maintaining the temperature above 160° C. and exhausting all of the ammonia generated while the batch is above 160° C., permitting the charge to cool below 160° C., blowing the entrained ammonia therefrom, and returning the spent liquor to a new cycle.

3. A process of making ammonia from cyanamide which consists in applying steam to cyanamide in a closed vessel to bring about a reaction, cutting off said steam, slowly discharging a portion of the ammonia thus generated while maintaining a temperature of 160° C., and then completely exhausting the ammonia from the vessel.

4. A process of making ammonia from cyanamide which consists in applying steam to cyanamide in a closed vessel to bring about a reaction, cutting off said steam, permitting the exothermic reaction to run for a period short of completion, slowly discharging a portion of the ammonia generated until the reaction has been substantially completed, while maintaining a temperature of 160° C., and then completely exhausting the ammonia from the vessel.

5. A process of making ammonia from cyanamide which consists in applying steam to cyanamide in a closed vessel to bring about a reaction, cutting off said steam, permitting the exothermic reaction to continue for a period, slowly discharging the ammonia generated with a minimum drop in temperature for at least two hours while maintaining a temperature of 160° C., and then completely exhausting the ammonia from the vessel.

6. A process of making ammonia from cyanamide which consists in applying steam to cyanamide in a closed vessel to bring about a reaction, cutting off said steam, permitting the exothermic reaction to run for a period at a temperature of 160° C. and above that at which difficulty decomposable nitrogen compounds are formed, maintaining a temperature above this minimum by exothermic reaction heat until the reaction is substantially complete, and then exhausting the ammonia from the vessel.

7. A process of making ammonia from cyanamide which consists in applying steam to cyanamide in a closed vessel to bring about a reaction, cutting off said steam, permitting the exothermic reaction to run for a period at a temperature of 160° C. and above that at which difficulty decomposable nitrogen compounds are formed, maintaining a temperature above this minimum until the reaction is substantially complete by slowly discharging ammonia from the vessel, and then completely exhausting the ammonia from the vessel.

8. A process of making ammonia from cyanamide which consists in making a slurry of cyanamide and an aqueous solution containing caustic soda, applying steam to the slurry in a closed vessel to bring about a reaction, cutting off said steam after the charge has reached a temperature of 160° C., permitting the exothermic reaction to run to completion while maintaining a temperature above 160° C. by exothermic reaction heat and while drawing off the ammonia generated.

9. The process of making ammonia from cyanamide which consists in applying steam to cyanamide in a closed vessel to bring about a reaction and when a temperature of 160° C. is reached cutting off said steam, withdrawing from the chamber only enough ammonia to enable the exothermic reaction to continue and maintaining the temperature at or above 160° C. until the reaction has been completed, and then exhausting the ammonia from the vessel.

In testimony whereof, I have hereunto subscribed my name this 18th day of February, 1929.

PHILIP H. FALTER.